United States Patent
Huh et al.

(10) Patent No.: US 9,619,091 B2
(45) Date of Patent: Apr. 11, 2017

(54) DISPLAY DEVICE AND MANUFACTURING METHOD THEREOF

(71) Applicant: Samsung Display Co., Ltd., Yongin (KR)

(72) Inventors: Jae Won Huh, Seoul (KR); Tae Ik Kim, Asan-si (KR); In Young Han, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 63 days.

(21) Appl. No.: 14/446,903

(22) Filed: Jul. 30, 2014

(65) Prior Publication Data

US 2015/0220191 A1    Aug. 6, 2015

(30) Foreign Application Priority Data

Feb. 3, 2014  (KR) ......................... 10-2014-0012114

(51) Int. Cl.
   *G06F 3/044*    (2006.01)
(52) U.S. Cl.
   CPC .................................... *G06F 3/044* (2013.01)
(58) Field of Classification Search
   CPC . G06F 2203/04111; G06F 2203/04103; G06F 3/044
   See application file for complete search history.

(56) References Cited

U.S. PATENT DOCUMENTS

| | | | |
|---|---|---|---|
| 8,570,457 B2 | 10/2013 | Tomiyoshi | |
| 2010/0171718 A1* | 7/2010 | Denda | G06F 3/044 345/173 |
| 2011/0050625 A1* | 3/2011 | Kim | G06F 3/044 345/174 |
| 2011/0134055 A1* | 6/2011 | Jung | G06F 3/044 345/173 |
| 2011/0157086 A1* | 6/2011 | Ozeki | G06F 3/044 345/174 |
| 2012/0075257 A1* | 3/2012 | Choi | G06F 3/044 345/176 |

(Continued)

FOREIGN PATENT DOCUMENTS

| | | |
|---|---|---|
| JP | 2013-152560 | 8/2013 |
| KR | 10-2012-0054838 | 5/2012 |

(Continued)

*Primary Examiner* — Kumar Patel
*Assistant Examiner* — Amy C Onyekaba
(74) *Attorney, Agent, or Firm* — H.C. Park & Associates, PLC (57) ABSTRACT

A display device includes: a lower substrate; a display layer disposed on the lower substrate and including an electro-optical active layer; a touch electrode layer disposed on the display layer and including first touch electrodes arranged in columns and second touch electrodes arranged in rows intersecting the columns; connections connecting adjacent first electrodes in each of the columns, connections each including islands disposed on the second electrodes, and bridges connecting the first electrodes to the islands; and an insulating layer electrically separating the second touch electrodes and the bridges. The bridges each include a first end that is directly connected to one of the first electrodes and a second end that is indirectly connected to another one of the first electrodes.

7 Claims, 10 Drawing Sheets

(56) References Cited

U.S. PATENT DOCUMENTS

| | | | | |
|---|---|---|---|---|
| 2012/0105343 A1* | 5/2012 | Lee | G06F 3/044 |
| | | | | 345/173 |
| 2012/0182230 A1* | 7/2012 | Wang | G06F 3/044 |
| | | | | 345/173 |
| 2012/0194474 A1* | 8/2012 | Chang | G06F 3/044 |
| | | | | 345/174 |
| 2013/0057495 A1* | 3/2013 | Wang | G06F 3/044 |
| | | | | 345/173 |
| 2013/0155011 A1* | 6/2013 | Kim | G06F 3/044 |
| | | | | 345/174 |
| 2013/0285939 A1* | 10/2013 | Kim | G06F 3/041 |
| | | | | 345/173 |
| 2014/0042398 A1* | 2/2014 | Choi | H01L 27/3244 |
| | | | | 257/40 |
| 2014/0061597 A1* | 3/2014 | Choi | H01L 51/5284 |
| | | | | 257/40 |

FOREIGN PATENT DOCUMENTS

| | | |
|---|---|---|
| KR | 10-2012-0075982 | 7/2012 |
| KR | 10-2012-0113850 | 10/2012 |
| KR | 10-2013-0107682 | 10/2013 |

* cited by examiner

DISPLAY DEVICE AND MANUFACTURING METHOD THEREOF

CROSS-REFERENCE TO RELATED APPLICATION

This application claims priority from and the benefit under 35 U.S.C. §119(a) of Korean Patent Application No. 10-2014-0012114, filed on Feb. 3, 2014, the entire disclosure of which is incorporated herein by reference for all purposes.

BACKGROUND

Field

The present disclosure relates to a display device, more particularly, to a display device including a touch sensor and a manufacturing method thereof.

Discussion of the Background

A flat panel display (FPD), such as an organic light emitting diode (OLED) display, a liquid crystal display (LCD), and an electrophoretic display (EPD), include a field generating electrode and an electro-optical active layer. The organic light emitting diode display includes an organic emission layer as the electro-optical active layer. The liquid crystal display includes a liquid crystal layer as the electro-optical active layer. The electrophoretic display includes particles having a charge as the electro-optical active layer. The field generating electrode may receive a data signal by being connected to a switching element, such as a thin film transistor, and the electro-optical active layer displays an image by converting the data signal into an optical signal.

The display device may include a touch sensing function as well as the function for displaying the image to allow interaction with a user. A touch sensing function determines whether a user finger, a utensil, or the like touches a screen, and touch position information thereof, by sensing a change of pressure, light, and the like that occurs on a screen of the display device when the user contacts the display screen with a finger or a touch pen to write a character or to draw a picture. The display device may receive an image signal based on the touch information.

The touch sensing operation or capability may be realized or provided by a touch sensor including a touch electrode. Touch electrodes are connected to each other in a predetermined direction. These connections between the touch electrodes may be realized by a metal bridge positioned at a different layer from the touch electrode. However, because the metal bridge is opaque, the transmittance may be reduced through interference with the pixel. Further, this problem becomes more serious as resolution of the display panel is increased.

The above information disclosed in this Background section is only for enhancement of understanding of the background related to the present disclosure and therefore it may contain information that does not form the prior art that is already known in this country to a person of ordinary skill in the art.

SUMMARY

Exemplary embodiments of the present invention provide a display device including a touch sensor and a bridge with a reduced length connecting a touch electrode, to improve contact resistance between the touch electrode and the bridge.

Exemplary embodiments of the present invention provide a display device according to an exemplary embodiment of the present invention includes: a lower substrate; a display layer disposed on the lower substrate and including an electro-optical active layer; a touch electrode layer disposed on the display layer, the touch electrode layer including first touch electrodes arranged in columns and second touch electrodes arranged in rows intersecting the columns; connections connecting adjacent first electrodes in each of the columns, the connections each including islands disposed on the second electrodes, and bridges connecting the first electrodes to the islands; and an insulating layer electrically separating the second touch electrodes and the bridges. The bridges each include a first end that is directly connected to one of the first electrodes and a second end that is indirectly connected to another one of the first electrodes.

Exemplary embodiments of the present invention provide a method of manufacturing a display device including a touch sensor having a plurality of touch electrodes is provided. The method includes: forming and patterning an electrode layer to form first touch electrodes arranged in columns and second touch electrodes arranged in rows intersecting the columns; forming and patterning a metal layer on a substrate to form bridges for electrically connecting adjacent first touch electrodes; and forming and patterning a first insulating layer to electrically separate the second touch electrodes and the bridges, in which the bridges each comprise a first end that is directly connected to one of the first electrodes and a second end that is indirectly connected to another one of the first electrodes.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

It will be understood that, although the terms first, second, etc. may be used herein to describe various elements, components, regions, layers and/or sections, these elements, components, regions, layers and/or sections are not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A display device including a touch sensor according to exemplary embodiments of the present invention will be described with reference to accompanying drawings. Although exemplary embodiments will be described with respect to an organic light emitting device, aspects of the invention are not limited thereto, such that the aspects of the invention may be applied to other display devices, such as a liquid crystal display, an electrophoretic display, and the like.

Figure 1:
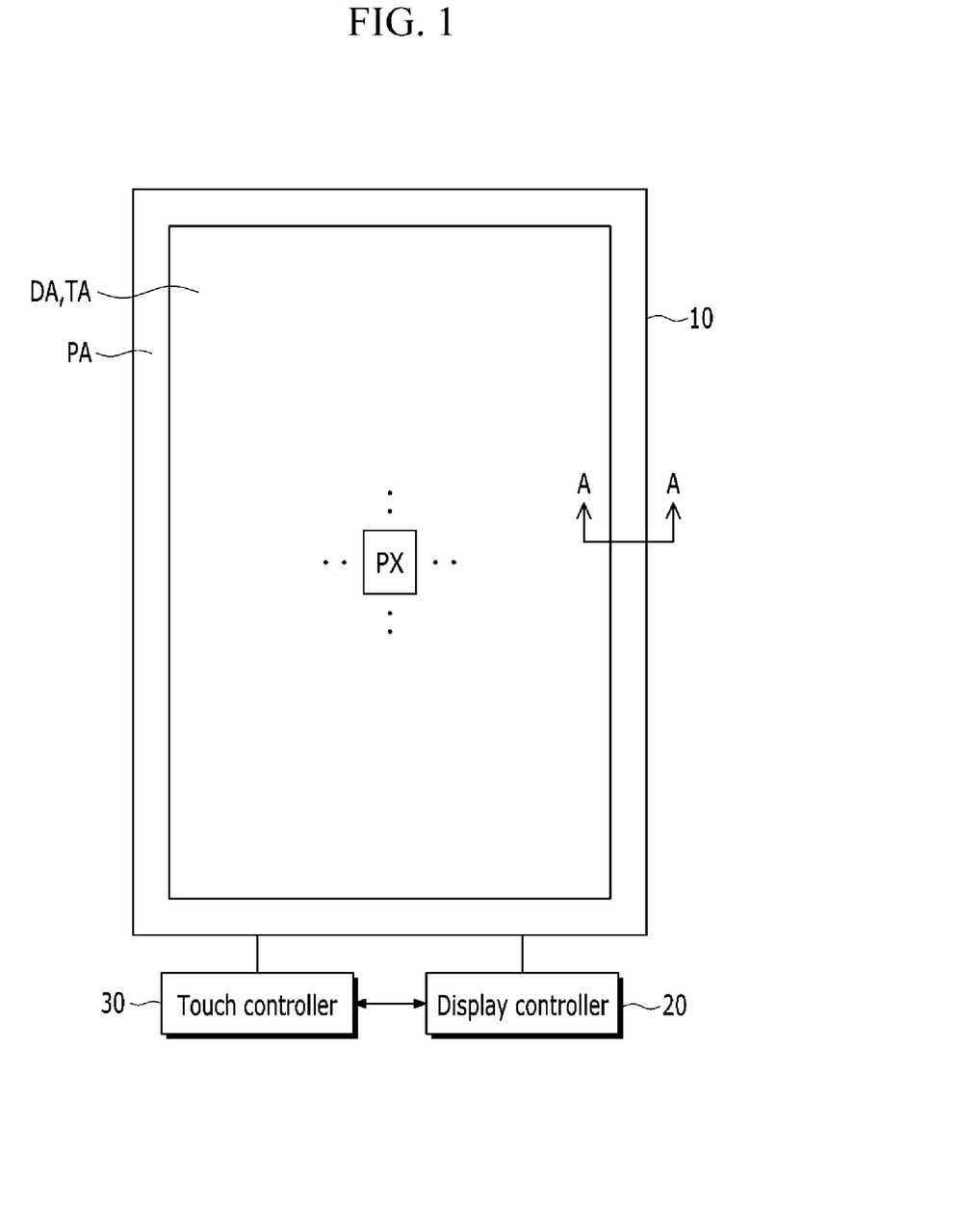
FIG. 1 is a schematic layout view of a display device including a touch sensor, according to an exemplary embodiment of the present invention.
Figure 2:
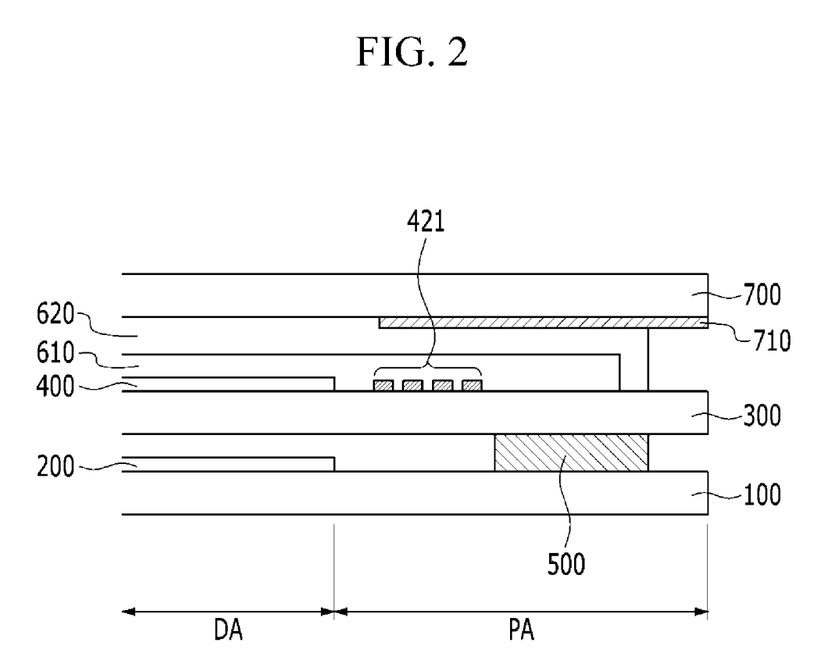
FIG. 2 is a schematic cross-sectional view of the display device shown in FIG. 1 taken along line A-A of FIG. 1.
Figure 3:
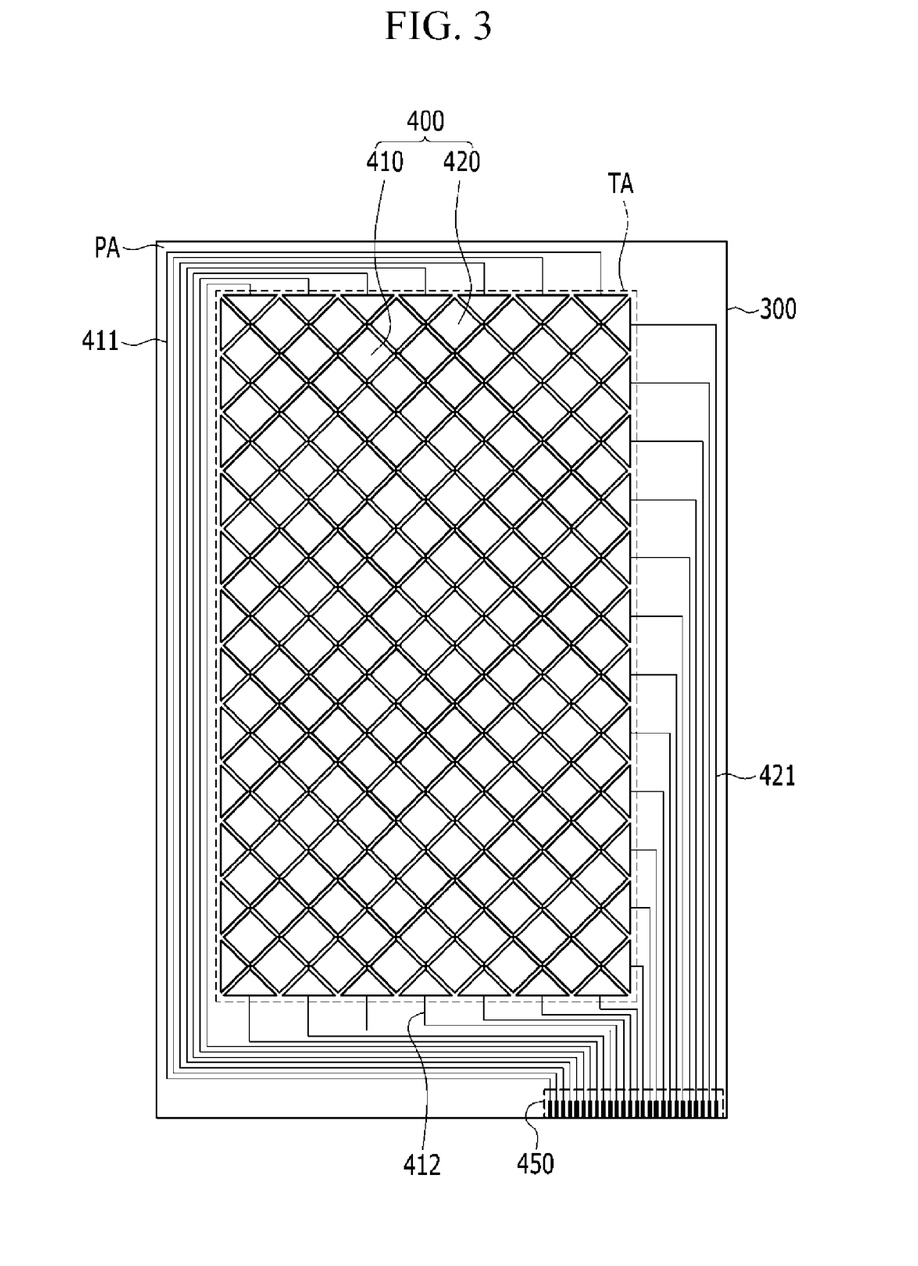
FIG. 3 is a top plan view of a touch sensor of a display device according to an exemplary embodiment of the present invention.

FIG. 1 is a schematic layout view of a display device including a touch sensor according to an exemplary embodiment of the present invention. FIG. 2 is a schematic cross-sectional view of the display device shown in FIG. 1 taken along line A-A of FIG. 1. FIG. 3 is a top plan view of a touch sensor of a display device according to an exemplary embodiment of the present invention.

Referring to FIG. 1, a display device includes a display panel 10, a display controller 20 connected to the display panel 10, and a touch controller 30.

The display panel 10 may display at least one of an image, alpha numeric characters, moving pictures and the like. The display panel 10 may also receive and/or sense a touch input. The display panel 10 includes a display area DA where an image may be displayed, and a peripheral area PA provided at the periphery of the display area DA when viewed from a top plane view.

A partial or entire region of the display panel 10 may be a touch active area TA. The touch active area TA may be a region that may sense or detect an object approaching or contacting the touch display panel 10. In an example, the approach or contact may include, without limitation, an external object approaching the display panel 10, hovering over the display panel 10 in the approached state, and directly contacting the display panel 10.

The touch active area TA may correspond, overlap, or accord with the display area DA, however, aspects of the invention are not limited thereto. For example, the touch active area TA may also exist in a portion of the peripheral area PA, and/or the touch active area TA may exist in a portion of the display area DA.

Referring to FIG. 1, FIG. 2, and FIG. 3, the display panel 10 includes a lower substrate 100 and an opposing upper substrate 300. The display panel 10 further includes a display layer 200 disposed on the lower substrate 100 and a touch electrode layer 400 disposed on the upper substrate 300. The touch electrode layer 400 may operate as a touch sensor. The lower substrate 100 and the upper substrate 300 may be sealed by a sealant 500 in the peripheral area PA.

The display layer 200 positioned on the lower substrate 100 may include a transparent insulator, such as a glass substrate. The display layer 200 may also include an electro-optical active layer, which may include a plurality of pixels and a plurality of display signal lines connected to the pixels. A display signal line may transmit a driving signal, and may be primarily positioned at the display area DA.

The display signal line may include a plurality of gate lines, which may transmit gate signals, and a plurality of data lines, which may transmit data signals. The gate lines and the data lines may extend to cross, intersect, or overlap each other. The display signal lines may extend into the peripheral area PA to form a pad portion.

The pixels may be arranged in an approximate matrix, but aspects of the invention are not limited thereto. One or more pixels may include a switching element, which may be connected with the gate line and the data line, and a pixel electrode connected thereto. The switching element may be a three-terminal element, such as a thin film transistor, which may be disposed or integrated on the display panel 10. The switching element may be turned on or off according to the gate signal transferred by the gate line to selectively transfer the data signal transferred by the data line to the pixel electrode. The pixel may further include a pixel electrode and a common electrode, which may face or be disposed across from the pixel electrode. For the organic light emitting diode display, an emission layer may be positioned between the pixel electrode and the common electrode to form a light emitting element. The common electrode may transfer a common voltage.

In order to implement color display, one or more pixels may display one of primary colors, and a target color may be recognized by combining the primary colors. In an example, primary colors may include three primary colors or four primary colors, such as red, green, blue, and the like. One or more pixels may further include a color filter positioned at a place corresponding to a pixel electrode. The emission layer included in the light emitting element may emit colored light.

A touch electrode layer 400 may be disposed on the upper substrate 300. The touch electrode layer 400 may include a transparent insulator, such as glass, a first touch electrode 410, and a second touch electrode 420. The touch electrode layer 400 may primarily be positioned at the touch active region TA. According to an exemplary embodiment, the touch electrode layer 400 may be disposed under the upper substrate 300, or may be separately disposed on a substrate to be adhered to the upper substrate 300.

The touch sensor including the touch electrode layer 400 may sense a contact or a touch input through various methods. The touch sensor may be classified into various types, such as a resistive type, a capacitive type, an electromagnetic type, and an optical type. For purposes of disclosure, a capacitive touch sensor will be described as an example.

The sealant 500 is positioned at the peripheral area PA where the lower substrate 100 and the upper substrate 300 face each other. The sealant 500 may form a closed line enclosing the display area DA. The sealant 500 may connect the lower substrate 100 and the upper substrate 300 to prevent or impede impurities, such as moisture or oxygen, from penetrating between the lower substrate 100 and the upper substrate 300 from the outside. To increase usage efficiency of an irradiated laser when forming or disposing the sealant 500, a reflection layer may be positioned between the lower substrate 100 and the sealant 500, and a plane region occupied with the reflection layer may be the same as a plane region occupied with the sealant 500.

The sealant 500 may be formed by coating a sealing material. For example, sealing material may be applied or coated on the lower substrate 100 or an insulating layer deposited on the lower substrate 100 through a printing method, such as screen printing. Further, the upper substrate 300 may be aligned with the sealing material, and a laser may be used to cure the sealing material and form the sealant 500. The coated sealing material may be a solid state frit. The sealing material may be melted and adhered to the lower substrate 100 and the upper substrate 300 like an adhesive, by the laser. The sealing material may be hardened while adhered to the lower substrate 100 and the upper substrate 300 to become the sealant 500, which may combine the lower substrate 100 and the upper substrate 300. Further, according to a characteristic of the sealing material, if the laser is radiated, for example, a sealing material of a gel state may be hardened to form the sealant 500.

For an organic light emitting device, the upper substrate 300 may operate as a sealing substrate. More specifically, the upper substrate 300 may seal a light-emitting device LD to prevent or impede the infiltration of external moisture and/or oxygen. The light-emitting device LD will be described in more detail later.

In the peripheral area of the upper substrate 300, a first touch signal line 411, a second touch signal line 412, and a third touch signal line 421, which may transmit signals to the first touch electrode 410 and the second touch electrode 420 of the touch electrode layer 400, may be positioned. The first touch signal line 411, the second touch signal line 412, and the third touch signal line 421 may be made of or include a metal material.

A reflection preventing layer 610, which may reduce the reflection of external light, may be positioned on the touch electrode layer 400. The reflection preventing layer 610 may be a circular polarizer, which may include a linear polarizer and a ¼λ retarder.

A window 700 may be disposed on the reflection preventing layer 610, to protect the lower substrate 100, the display layer 200, the upper substrate 300, and the touch electrode layer 400. A light blocking layer 710 may be positioned on a surface facing the upper substrate 300 at an edge of the window 700. Further, the light blocking layer 710 may cover at least a portion of the peripheral area PA of the display panel 10. The window 700 may be adhered to the reflection preventing layer 610 by an adhesive layer 620 including adhesive material, such as resin.

The touch sensor according to an exemplary embodiment of the present invention will be described with reference to FIG. 3, FIG. 4, FIG. 5, FIG. 6, FIG. 7, and FIG. 8.

Figure 4:
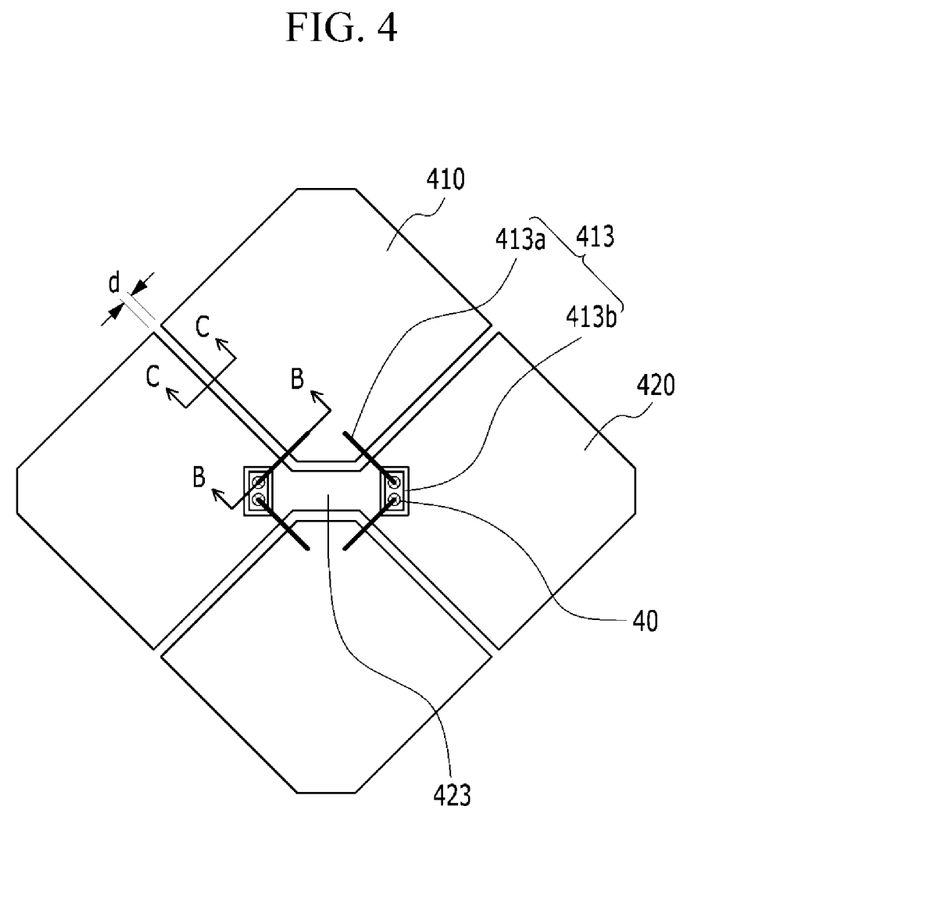
FIG. 4 is an enlarged view of a connection of adjacent touch electrodes in a touch sensor, according to an exemplary embodiment of the present invention.
Figure 5:
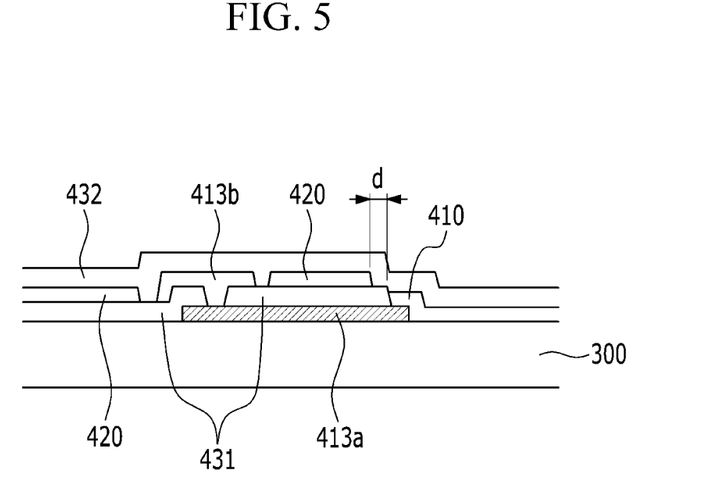
FIG. 5 is a cross-sectional view of the touch sensor shown in FIG. 4, taken along line B-B.
Figure 6:
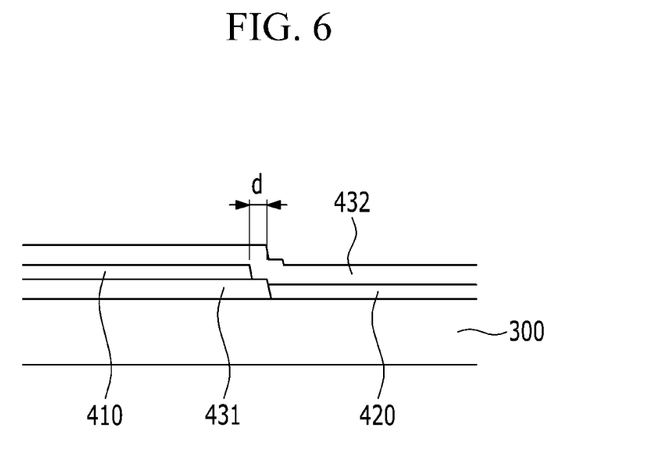
FIG. 6 is a cross-sectional view of the touch sensor shown in FIG. 4, taken along line C-C.

FIG. 4 is an enlarged view of a connection of adjacent touch electrodes included in a touch sensor according to an exemplary embodiment of the present invention. FIG. 5 is a cross-sectional view of the touch sensor shown in FIG. 4 taken along line B-B. FIG. 6 is a cross-sectional view of the touch sensor shown in FIG. 4 taken along line C-C.

Referring again to FIG. 3, the touch electrode layer 400 is disposed on an upper substrate 300. The touch electrode layer 400 is disposed in the touch active region TA for sensing a touch input. The touch active region TA may include or overlap some or all of the display area DA, and may also include a portion of the peripheral area PA.

The touch electrode layer 400 may sense a touch input and may include various types, for example, a capacitive type. The touch electrode layer 400 may include a plurality of touch electrodes, and the plurality of touch electrodes may include a plurality of first touch electrodes 410 and a plurality of second touch electrodes 420. The first touch electrodes 410 and the second touch electrodes 420 may be physically and/or electrically separated from each other.

A plurality of first touch electrodes 410 and a plurality of second touch electrodes 420 may be alternately dispersed to not substantially overlap each other in the touch active region TA. A plurality of first touch electrodes 410 may be disposed according to a column direction and a row direction, and a plurality of second touch electrodes 420 may be also disposed according to the column direction and the row direction.

The first touch electrode 410 and the second touch electrode 420 may be substantially positioned on the same layer. However, aspects of the invention are not limited thereto, such that the first touch electrode 410 and the second touch electrode 420 may be disposed at different layers. The first touch electrode 410 and the second touch electrode 420 have substantially quadrangular shapes. However, aspects of the invention are not limited thereto, such that various shapes having a protrusion to improve sensitivity may be provided. Also, the edge of the first touch electrode 410 and the second touch electrode 420 may be rough.

A plurality of first touch electrodes 410 arranged in the same column or row may be connected to each other or may be separated from each other inside or outside of the touch active region TA. Likewise, at least portions of a plurality of second touch electrodes 420 arranged in the same column or row may be connected to each other or may be separated from each other inside or outside the touch active region TA. For example, as shown in FIG. 3, when a plurality of first touch electrodes 410 disposed in the same column are connected inside the touch active region TA, a plurality of second touch electrodes 420 disposed in the same row may be connected to each other in the touch active region TA.

More specifically, as shown in FIG. 4, a plurality of first touch electrodes 410 positioned in each column may be connected to each other through a first connection or connector 413, and a plurality of second touch electrodes 420 positioned in each row may be connected to each other through a second connection or connector 423.

Referring to FIG. 4, FIG. 5, and FIG. 6, the second connection 423 connecting the adjacent second touch electrodes 420 may be positioned on the same layer as the second touch electrode 420. The second connection 423 may be formed of or include the same material as the second touch electrode 420. More specifically, the second touch electrode 420 and the second connection 423 may be integrated and simultaneously patterned. The first touch electrode 410 and the second touch electrode 420 may be separated by a predetermined interval d.

First connection or connector 413 connecting between the adjacent first touch electrodes 410 may include a bridge 413a and an island 413b, which may be positioned on different layers. The bridge 413a may be a linear conductor having a predetermined width and height. The bridge 413a may overlap the second touch electrode 420 as well as the first touch electrode 410. Further, the bridge 413a is insulated from the second touch electrode 420 by a first insulating layer 431. Accordingly, the first touch electrode 410 contacting the bridge 413a may be electrically separated from the second touch electrode 420. The island 413b may be disposed on or within the perimeter of the second touch electrode 420. Further, the island 413b may be physically and/or electrically separated from the second touch electrode 420. The island 413b may be formed of or include the same material as the first touch electrode 410, and may be simultaneously patterned therewith.

According to an exemplary embodiment, the island 413b may be disposed within a perimeter of the second connection 423. The island 413b may be disposed throughout the second touch electrode 420 and the second connection 423. The bridge 413a may be formed of or include the same material as the first touch signal line 411, the second touch signal line 412, and the third touch signal line 421 that are described later, and are simultaneously patterned therewith.

Two bridges 413a form a pair with or are connected to one island 413b, and electrically connect the first touch electrodes 410. The first touch electrodes 410 may be disposed adjacent to each other. A first end of the bridge 413a may be connected to the first touch electrodes 410, and an opposing second end of the bridge 413a may be connected to the island 413b. One of the first touch electrodes 410 may be directly connected to the first end of the bridge 413a, and the island 413b may be connected to the second end of the bridge 413a through a contact hole 40 formed in the first insulating layer 431. More specifically, the first end of the bridge 413a contacts the first touch electrode 410 directly, rather than being connected through a contact hole formed in the insulating layer 431. Accordingly, a first end of the bridge 413a is connected with the first touch electrode 410 and a second end of the bridge 413a is connected with the first insulating layer 431.

Likewise, the other first touch electrode 410 is directly connected to the first end of the other bridge 413a, and the island 413b is connected to the second end of the other bridge 413a through the contact hole 40 formed in the first insulating layer 431.

By the above connection, one first touch electrode 410 is electrically connected to the other first touch electrode 410 through the two bridges 413a and the island 413b. As shown in FIG. 4, this connection may be provided at two positions, such that resistance caused by the connection may be reduced. However, aspects of the invention are not limited thereto, such that the number of connections may be greater than two or less than two.

Referring to FIG. 5 and FIG. 6, among the first connection, the bridge 413a is positioned or disposed on the upper substrate 300 and the first insulating layer 431 is positioned or disposed on the bridge 413a and the upper substrate 300. The second touch electrode 420 and the island 413b are positioned or disposed on the first insulating layer 431. However, as shown in the drawing, the first touch electrode 410 is not positioned or disposed on the first insulating layer 431 and may be positioned or disposed directly on the upper substrate 300. Further, a portion of the first touch electrode 410 may be disposed over a portion of the bridge 413a. The first touch electrode 410 and the second touch electrode 420 are separated by a predetermined interval d. However, aspects of the invention are not limited thereto, such that a portion of the first touch electrode 410 may be positioned or disposed on the first insulating layer 431.

The first touch electrode 410, the second touch electrode 420, the island 413b, and the second connection 423 may form the touch electrode layer with the same material. Further, the first touch electrode 410, the second touch electrode 420, the island 413b, and the second connection 423 may be patterned to be simultaneously formed.

The island 413b is connected to the bridge 413a through the contact hole 40 formed or included in the first insulating layer 431. Further, the first touch electrode 410 is directly connected to the bridge 413a, and not through a contact hole formed in the first insulating layer 431. To be stably connected to the bridge 413a through the contact hole 40, a length of the bridge 413a may be longer than a reference threshold. For the direct connection, a length of the bridge 413a may be reduced in comparison with the connection through the contact hole 40, such that the length of the bridge 413a, more particularly, the length at a side of the first end, may be reduced. As a result, the pixel area that may be covered by the bridge 413a may be reduced, thereby improving transmittance. Also, for the direct connection, a contact area of the first touch electrode 410 and the bridge 413a may be increased in comparison with the connection through the contact hole, such that the contact resistance therebetween may be improved.

A second insulating layer 432 may be disposed on or over the first touch electrode 410, the second touch electrode 420, and the island 413b to protect them. The first insulating layer 431 and the second insulating layer 432 may be formed of or include at least one of a silicon oxide, a silicon nitride, and/or a silicon oxynitride.

According to an exemplary embodiment, the connection between the first touch electrodes 410 and the connection between the second touch electrodes 420 may be reversed. More specifically, the first touch electrodes 410 may be connected by the connection that is formed on the same layer and with the same material as the first touch electrode 410. Further, the second touch electrode 420 may be connected by the bridge and the first touch electrode 410, and/or the island within the connection of the first touch electrode 410. The first touch electrodes 410 and the second touch electrodes 420 may be adjacent to one another.

Again referring to FIG. 3, the first touch electrodes 410 that are connected to each other in each column are connected to the touch controller 30 through the first touch signal line 411 and the second touch signal line 412, and the second touch electrodes 420 that are connected to each other in each row are connected to the touch controller 30 through the third touch signal lines 421. The first touch signal line 411 and the second touch signal line 412 may have a double routing structure including the first touch signal line 411 connected to an upper end of the first touch electrodes 410 connected to each other in the same column and the second touch signal line 412 connected to a lower end thereof. The first touch signal line 411, the second touch signal line 412, and the third touch signal line 421, as shown in FIG. 3, may be positioned at the peripheral area PA of the upper substrate 300. The ends of the first touch signal line 411, the second touch signal line 412, and the third touch signal line 421 form or configure a pad portion 450 in the peripheral area PA of the upper substrate 300.

The first touch electrode 410 and the second touch electrode 420 may have predetermined transmittance or more so that light from the display layer 200 may be transmitted. For example, at least one of the first touch electrode 410 and the second touch electrode 420 may be formed of or include transparent conductive oxide (TCO), such as indium tin oxide (ITO) and indium zinc oxide (IZO). The material of the second connection 423 and the island 413b may be the same. According to an exemplary embodiment, at least one of the first touch electrode 410, the second touch electrode 420, the second connection 423, and the island 413b may be made of a transparent conductive material, such as indium tin oxide (ITO) and indium zinc oxide (IZO), a thin metal layer, such as a silver nanowire (AgNW), a metal mesh, and carbon nanotubes (CNT).

The first touch signal line 411, the second touch signal line 412, and the third touch signal line 421 may include a metal material, such as molybdenum (Mo), silver (Ag), titanium (Ti), copper (Cu), aluminum (Al) or alloys thereof. Further, the first touch signal line 411, the second touch signal line 412, and the third touch signal line 421 may be formed of or include a single layer or a multilayer. The bridge 413a of the first connection is the same.

According to aspects of the invention, a metal layer is disposed and patterned on the upper substrate 300 to form the bridge 413a. Further, the first touch signal line 411, the second touch signal line 412, and the third touch signal line 421 positioned at the peripheral area PA may be formed together.

The insulating layer may be disposed and patterned to form or be configured as the first insulating layer 431. Further, the insulating layer may be removed near the first end of the bridge 413a to expose some or all of the first ends of the bridge 413a. The contact hole 40 may be formed in the insulating layer near the second end of the bridge 413a to expose at least a portion of the second end of the bridge 413a.

The electrode layer may be disposed and patterned to form at least one of the first touch electrode 410, the second touch electrode 420, the second connection 423, and the island 413b. Further, the first touch electrode 410 may be connected with some or all of the first end of the bridge 413a. The island 413b may be connected with at least a portion of the second end of the bridge 413a through the contact hole 40.

The second insulating layer 432, which may cover or overlap some or all of the touch electrode layer.

The first touch electrode 410 and the second touch electrode 420, which may be adjacent to each other, may form or be configured as a mutual sensing capacitor serving as the touch sensor. In the mutual sensing capacitor, among the first touch electrode 410 and the second touch electrode 420, one may be a sensing input electrode that may receive a sensing input signal, and the other may be a sensing output electrode that may output a change of a charge amount caused by the contact of an external object as a sensing output signal. According to aspects of the invention, the sensing input signal and the sensing output signal may be referred to as a touch signal.

Differently from FIG. 3, FIG. 4, and FIG. 5, according to aspects of the invention, a plurality of first touch electrodes 410 may be separated from each other, a plurality of second touch electrodes 420 may also be separated from each other, and the plurality of first touch electrodes 410 and second touch electrodes 420 may be connected to the touch controller 30 through an independent touch signal line. Further, one or more touch electrodes may form or be configured as a self-sensing capacitor, which may operate as a touch sensing sensor. The self-sensing capacitor may be charged with a predetermined charge amount by receiving the sensing input signal. If the contact by an external object, such as a finger or a utensil is detected or sensed, a change in the charge amount is generated and the sensing output signal that is different from the input sensing input signal may be output.

Figure 7:
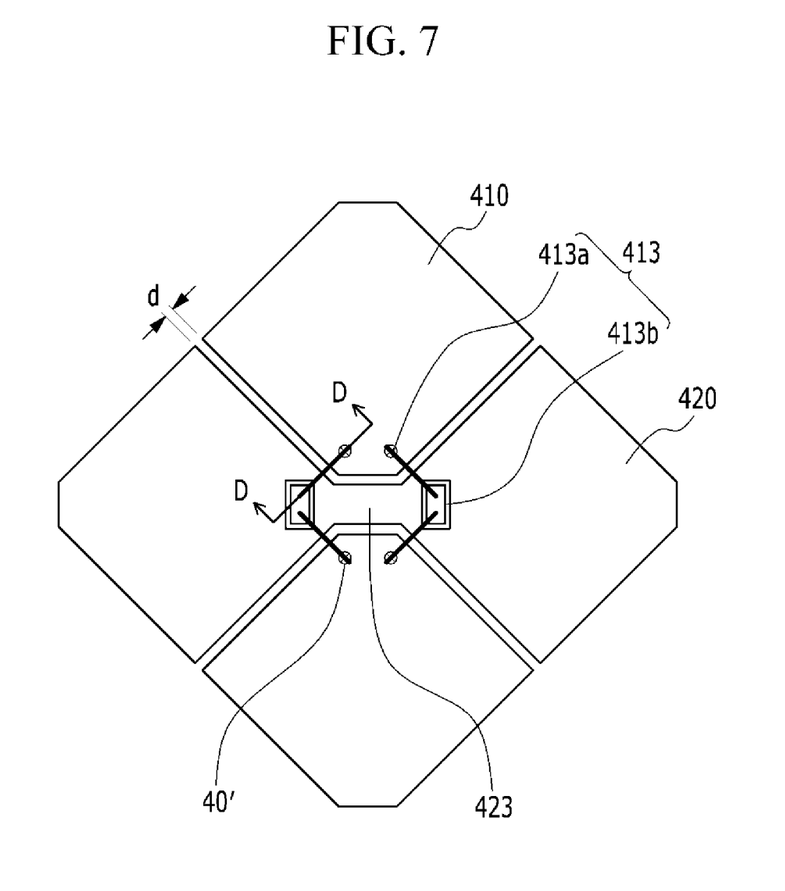
FIG. 7 is an enlarged view of a connection of adjacent touch electrodes in a touch sensor according to exemplary embodiment of the present invention.
Figure 8:
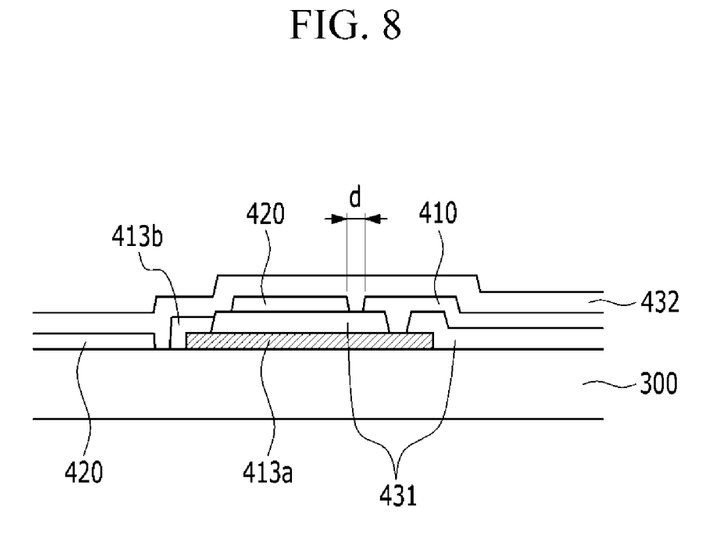
FIG. 8 is a cross-sectional view of the touch sensor shown in FIG. 7 taken along line D-D.

FIG. 7 is an enlarged view of a connection of adjacent touch electrodes in a touch sensor according to an exemplary embodiment of the present invention. FIG. 8 is a cross-sectional view of the touch sensor shown in FIG. 7 taken along line D-D.

FIG. 7 and FIG. 8 are similar to exemplary embodiments shown in FIG. 4 and FIG. 5, however, the first end of the bridge 413a is connected to the first touch electrode 410 through a contact hole 40' formed or included in the first insulating layer 431, and the second end of the bridge 413a is connected directly to the island 413b. The first touch electrode 410 may be positioned or disposed on the first insulating layer 431, and at least a portion of the second touch electrode 420 may be positioned or disposed directly on the upper substrate 300 (e.g., the portion of the second touch electrode 420 near the island 413b, not on the first insulating layer 431). A merit of the direct connection without the contact hole may be similar or the same as described above. In addition, the length of the bridge 413a of the side of the second end may be reduced, such that the width of the island 413b may be reduced.

A pixel of the organic light emitting device according to exemplary embodiments of the present invention will be described with reference to FIG. 9, FIG. 10, and FIG. 11.

Figure 9:
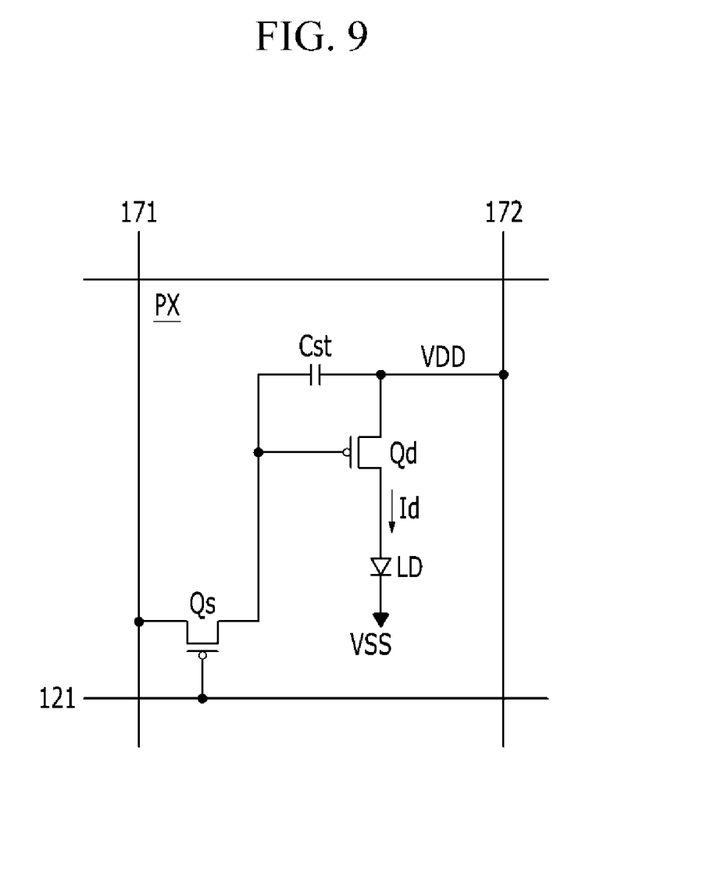
FIG. 9 is an equivalent circuit diagram of a display device of a pixel according to an exemplary embodiment of the present invention.

FIG. 9 is an equivalent circuit diagram of a display device of a pixel according to an exemplary embodiment of the present invention. FIG. 10 is a layout view of a pixel of a display device according to an exemplary embodiment of the present invention. FIG. 11 is a cross-sectional view taken along line E-E of FIG. 10.

As described above, the display layer 200 includes a plurality of switching and driving thin film transistors Qs and Qd, a plurality of storage capacitors Cst, and a plurality of light-emitting devices LD. More specifically, the display layer 200 includes a plurality of pixels.

Referring to FIG. 9, the display device includes a plurality of signal lines, gate signal lines 121, data lines 171, and driving voltage lines 172, and a plurality of pixels PX connected thereto and arranged substantially in a matrix.

The signal lines include a plurality of gate lines 121 transmitting a gate signal, a plurality of data lines 171 transmitting a data signal, and a plurality of driving voltage lines 172 transmitting a driving voltage VDD. The gate signal lines 121 extend substantially in a row direction and may be substantially parallel to each other. The data lines 171 and the driving voltage lines 172 extend substantially in a column direction and may be substantially parallel to each other. The gate signal and the data signal may be applied through a display controller 20 (see e.g., FIG. 1).

Each pixel PX includes a switching thin film transistor Qs, a driving thin film transistor Qd, a storage capacitor Cst, and a light emitting device LD.

The switching thin film transistor Qs may include a control terminal, an input terminal, and an output terminal. The control terminal may be connected to the gate line 121, the input terminal may be connected to the data line 171, and the output terminal may be connected to the driving thin film transistor Qd. The switching thin film transistor Qs may transfer the data signal applied to the data line 171 to the driving thin film transistor Qd in response to the gate signal applied to the gate line 121.

The driving thin film transistor Qd may also include a control terminal, an input terminal, and an output terminal. The control terminal of the driving thin film transistor Qd may be connected to the switching thin film transistor Qs. The input terminal of the driving thin film transistor Qd may be connected to the driving voltage line 172. The output terminal of the driving thin film transistor Qd may be connected to the light emitting device LD. The driving thin film transistor Qd may flow or carry an output current Id of which the magnitude varies depending on a voltage applied between the control terminal and the output terminal.

The storage capacitor Cst may be connected between the control terminal and the input terminal of the driving thin film transistor Qd. The storage capacitor Cst may charge the data signal applied to the control terminal of the driving thin film transistor Qd and maintain the charged data signal even after the switching thin film transistor Qs is turned off.

The light emitting device LD, which may be an organic light emitting diode, may include an anode, which is connected to the output terminal of the driving thin film transistor Qd, and a cathode, which is connected to a common voltage VSS. The light emitting device LD may display an image by emitting light of which the strength varies based on the output current Id of the driving thin film transistor Qd.

The switching thin film transistor Qs and the driving thin film transistor Qd may be n-channel field effect transistors (FET) or p-channel field effect transistors. A connection relationship among the switching and driving thin film transistors Qs and Qd, and the storage capacitor Cst, and the light emitting device LD may be changed.

Figure 10:
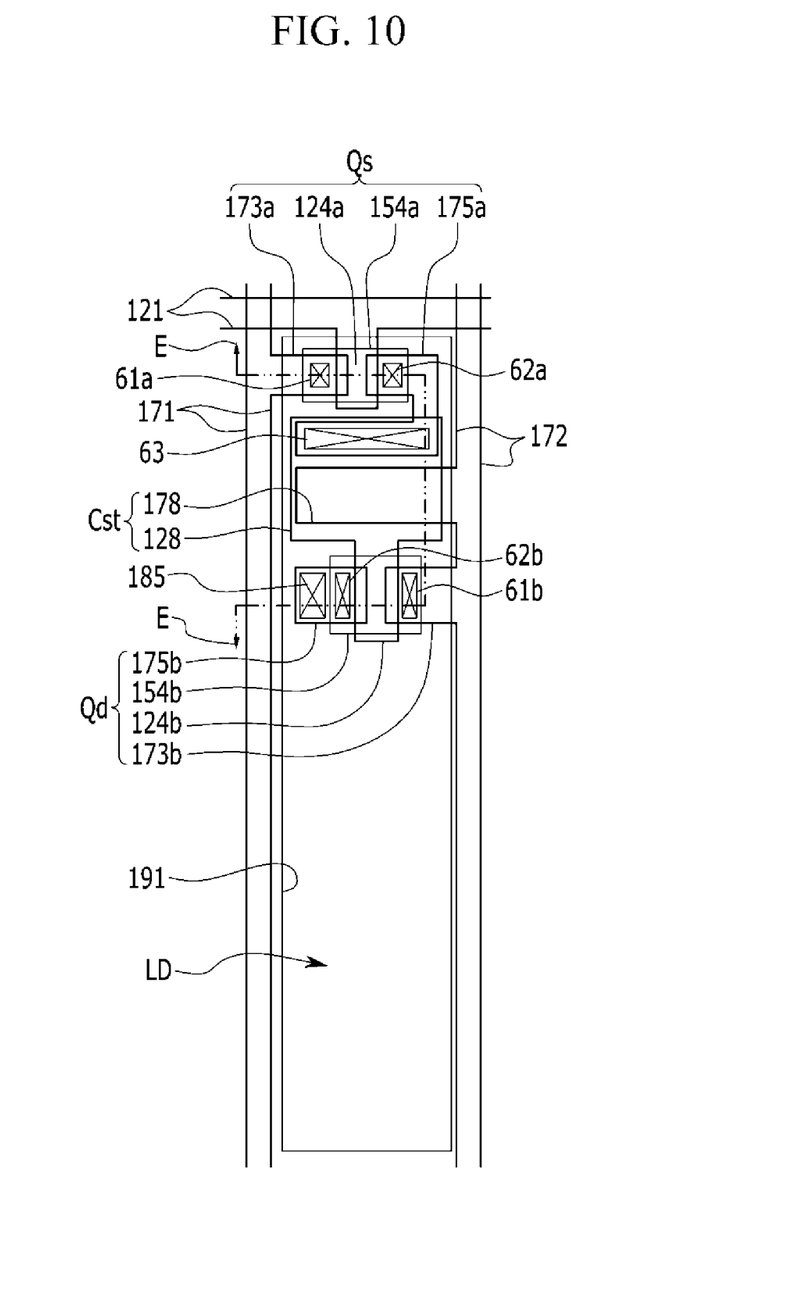
FIG. 10 is a layout view of a pixel of a display device according to an exemplary embodiment of the present invention.
Figure 11:
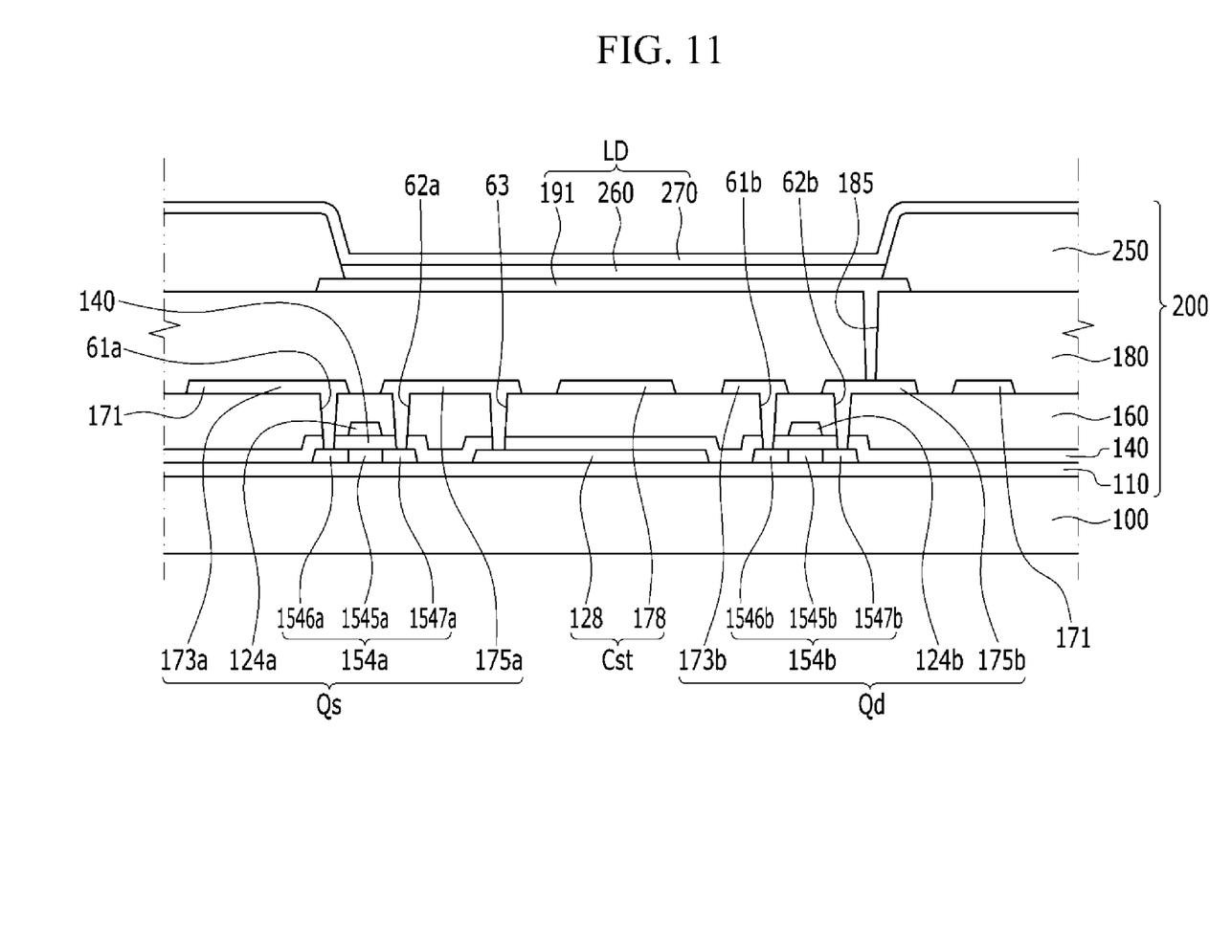
FIG. 11 is a cross-sectional view taken along line E-E of FIG. 10.

Referring to FIG. 10 and FIG. 11, a display device includes the lower substrate 100, the display layer 200 positioned or disposed on the lower substrate 100, and the light-emitting device LD.

The lower substrate 100 may be made of transparent glass or plastic. The lower substrate 100 may be a flexible substrate.

The display layer 200 includes a buffer layer 110, a switching semiconductor layer 154a, a driving semiconductor layer 154b, a gate insulating layer 140, the gate line 121, a first capacitor plate 128, an interlayer insulating layer 160, the data line 171, the driving voltage line 172, a switching drain electrode 175a, a driving drain electrode 175b, and a passivation layer 180.

The buffer layer 110 may be disposed on the lower substrate 100 and may include a silicon nitride (SiNx), a silicon oxide (SiOx), a silicon oxynitride (SiOxNy), or the like. The buffer layer 110 may be formed in a single layer or a multilayer. The buffer layer 110 may prevent or impede impurities, moisture, or external air, which may degrade characteristics of the semiconductor, from permeating into the display device, and serves to planarize the surface.

The switching semiconductor layer 154a and the driving semiconductor layer 154b may be disposed on the buffer layer 110 while being spaced apart from each other. The switching semiconductor layer 154a and the driving semiconductor layer 154b may be made of polycrystalline silicon, and include a first channel region 1545a, a second channel region 1545b, a first source region 1546a, a second source region 1546b, a first drain region 1547a, and a second drain region 1547b. The first source region 1546a, the second source region 1546b, the first drain region 1547a, and the second drain region 1547b are each disposed at both sides of the first channel region 1545a and the second channel region 1545b.

At least one of the first channel region 1545a and the second channel region 1545b may include polycrystalline silicon, which is not doped with an impurity, such as an intrinsic semiconductor. At least one of the first source region 1546a and the second source region 1546b may include polycrystalline silicon, which is doped with a conductive impurity, such as an impurity semiconductor.

The gate insulating layer 140 is disposed on the first channel region 1545a and the second channel region 1545b of the switching semiconductor layer 154a and the driving semiconductor layer 154b. The gate insulating layer 140 may be formed in a single layer or a multilayer. The gate insulating layer 140 may include at least one of a silicon nitride and a silicon oxide.

The gate line 121 is disposed on the gate insulating layer 140 and the first capacitor plate 128 is disposed on the gate insulating layer 140.

The gate line 121 extends in a horizontal direction to transfer the gate signal, and includes a switching gate electrode 124a, which may protrude from the gate line 121 to the switching semiconductor layer 154a. The first capacitor plate 128 includes a driving gate electrode 124b, which may protrude from the first capacitor plate 128 to the driving semiconductor layer 154b. The switching gate electrode 124a and the driving gate electrode 124b each overlap the first channel region 1545a and the second channel region 1545b, respectively.

The interlayer insulating layer 160 is disposed on the gate line 121, the first capacitor plate 128, and the buffer layer 110. The interlayer insulating layer 160 is provided with a switching source contact hole 61a and a switching drain contact hole 62a, which respectively expose the source region 1546a and the drain region 1547a of the switching semiconductor layer 154a. Further, the interlayer insulating layer 160 is provided with a driving source contact hole 61b and a driving drain contact hole 62b, which respectively expose the source region 1546b and the drain region 1547b of the driving semiconductor layer 154b.

The data line 171, the driving voltage line 172, the switching drain electrode 175a, and the driving drain electrode 175b are disposed on the interlayer insulating layer 160.

The data line 171 may transfer the data signal, extend in a direction intersecting the gate line 121, and include a switching source electrode 173a, which may protrude toward the switching semiconductor layer 154a from the data line 171.

The driving voltage line 172 may transfer the driving voltage, be separated from the data line 171, and extend in the same direction as the data line 171. The driving voltage line 172 may include a driving source electrode 173b, which may protrude toward the driving semiconductor layer 154b from the driving voltage line 172, and a second capacitor plate 178, which may protrude from the driving voltage line 172 to overlap the first capacitor plate 128. The first capacitor plate 128 and the second capacitor plate 178 may form the storage capacitor Cst using the interlayer insulating layer 160 as a dielectric material.

The switching drain electrode 175a may face or be disposed across from the switching source electrode 173a. The driving drain electrode 175b may face or be disposed across from the driving source electrode 173b.

The switching source electrode 173a and the switching drain electrode 175a are respectively connected to the source region 1546a and the drain region 1547a of the switching semiconductor layer 154a through the switching source contact hole 61a and the switching drain contact hole 62a. Further, the switching drain electrode 175a may be electrically connected to the first capacitor plate 128 and the driving gate electrode 124b through a first contact hole 63, which may extend to be formed in the interlayer insulating layer 160.

The driving source electrode 173b and the driving drain electrode 175b may respectively be connected to the source region 1546b and the drain region 1547b of the driving semiconductor layer 154b through the driving source contact hole 61b and the driving drain contact hole 62b.

The switching semiconductor layer 154a, the switching gate electrode 124a, the switching source electrode 173a, and the switching drain electrode 175a may form the switching thin film transistor Qs. The driving semiconductor layer 154b, the driving gate electrode 124b, the driving source electrode 173b, and the driving drain electrode 175b may form the driving thin film transistor Qd.

The passivation layer 180 is disposed on the data line 171, the driving voltage line 172, the switching drain electrode 175a, and the driving drain electrode 175b. The passivation layer 180 is provided with a second contact hole 185, which may expose the driving drain electrode 175b.

The light emitting device LD and a pixel defining layer 250 are disposed on the passivation layer 180.

The light emitting device LD includes a pixel electrode 191, an organic emission layer 260, and a common electrode 270.

The pixel electrode 191 is disposed on the passivation layer 180, and is electrically connected to the driving drain electrode 175b of the driving thin film transistor Qd through the second contact hole 185 formed on the interlayer insulating layer 160. The pixel electrode 191 may operate or be configured as an anode of the light emitting device LD.

The pixel electrode 191 may be made of a transparent conductive material, such as ITO, IZO, ZnO, and In2O3, or a reflective metal, such as lithium (Li), calcium (Ca), lithium fluoride/calcium (LiF/Ca), lithium fluoride/aluminum (LiF/Al), aluminum (Al), silver (Ag), magnesium (Mg), and gold (Au).

The pixel defining layer 250 is disposed on an edge portion of the pixel electrode 191 and the passivation layer 180. The pixel defining layer 250 may have an opening through which the pixel electrode 191 is exposed. The pixel defining layer 250 may be made of a resin, such as a polyacrylate and a polyimide.

The organic emission layer 260 may be disposed on the pixel electrode 191 within the opening of the pixel defining layer 250. The organic emission layer 260 may include an emission layer and may be formed as a multilayer structure including at least one of a hole injection layer (HIL), a hole transport layer (HTL), an electron transport layer (ETL), and an electron injection layer (EIL). When the organic emission layer 260 includes some or all of the layers, the hole injection layer may be disposed on the pixel electrode 191, which may be configured as an anode, and the hole transport layer, the emission layer, the electron transport layer, and the electron injection layer may be sequentially stacked thereon.

The organic emission layer 360 may include a red organic emission layer configured to emit red light, a green organic emission layer configured to emit green light, and a blue organic emission layer configured to emit blue light. The red organic emission layer, the green organic emission layer, and the blue organic emission layer may be respectively formed in a red pixel, a green pixel, and a blue pixel to implement color images. The organic emission layer 360 may also implement color images by stacking the red organic emission layer, the green organic emission layer, and the blue organic emission layer in all of the red pixel, the green pixel, and the blue pixel and forming a red color filter, a green color filter, and a blue color filter for each pixel.

The common electrode 270 is disposed on the pixel defining layer 250 and the organic emission layer 260. The common electrode 270 may be made of a transparent conductive material, such as ITO, IZO, ZnO, and In2O3, or a metal such as lithium, calcium, lithium fluoride/calcium, lithium fluoride/aluminum, aluminum, silver, magnesium, and gold. The common electrode 270 may operate as or be configured as a cathode of the light emitting device LD.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
   a lower substrate;
   a display layer disposed on the lower substrate and comprising an electro-optical active layer;
   an upper substrate disposed on the display layer;
   a touch electrode layer disposed on the upper substrate, the touch electrode layer comprising first touch electrodes arranged in columns, and second touch electrodes arranged in rows intersecting the columns;
   touch signal lines disposed on the upper substrate and connected to each first touch electrode column and second touch electrode row;
   first connections connecting adjacent first electrodes in each of the columns, the first connections each comprising:
      islands disposed in the second electrodes and separated from the second electrodes, and
      bridges patterned directly on the upper substrate with the touch signal lines, the bridges connecting the first electrodes to the islands; and
   a first insulating layer electrically separating the second touch electrodes and the bridges,
   wherein the bridges each comprise a first end that is directly connected to one of the first electrodes and a second end that is indirectly connected to another one of the first electrodes,
   wherein in each of the first connections, the first end of each bridge is directly connected to one of the first electrodes, and the second end of each bridge is connected to one of the islands through contact holes formed in the first insulating layer.

2. The display device of claim 1, further comprising second connections connecting adjacent second touch electrodes in each of the rows, the second connections being disposed on in a same layer as the second touch electrodes.

3. The display device of claim 1, further comprising:
a second insulating layer disposed on the touch electrode layer.

4. The display device of claim 1, wherein a portion of the first touch electrode is directly disposed on the bridge, and a second portion of the first touch electrode is directly disposed on the upper substrate.

5. A display device, comprising:
a lower substrate;
a display layer disposed on the lower substrate and comprising an electro-optical active layer;
an upper substrate disposed on the display layer;
a touch electrode layer disposed on the upper substrate, the touch electrode layer comprising first touch electrodes arranged in columns, and second touch electrodes arranged in rows intersecting the columns;
touch signal lines disposed on the upper substrate and connected to each first touch electrode column and second touch electrode row;
first connections connecting adjacent first electrodes in each of the columns, the first connections each comprising:
  islands disposed in the second electrodes and separated from the second electrodes, and
  bridges patterned directly on the upper substrate with the touch signal lines, the bridges connecting the first electrodes to the islands; and
a first insulating layer electrically separating the second touch electrodes and the bridges,
wherein the bridges each comprise a first end that is connected to one of the first electrodes and a second end that is indirectly connected to another one of the first electrodes,
wherein in each of the first connections, the first end of each bridge is connected to one of the first electrodes through contact holes formed in the first insulating layer, and the second end of each bridge is directly connected to one of the islands, and
wherein the islands are directly connected to the second ends of the bridges.

6. The display device of claim 5, wherein the islands are disposed within a perimeter of the second touch electrodes, the islands being separated from the second touch electrodes, and
wherein the second ends of the bridges are directly connected to first portions of the islands, and second portions of the islands are directly disposed on the upper substrate.

7. The display device of claim 5, further comprising:
a second insulating layer disposed on the touch electrode layer.

* * * * *